United States Patent
Sakurai et al.

(10) Patent No.: US 7,050,100 B2
(45) Date of Patent: May 23, 2006

(54) SOLID-STATE IMAGING APPARATUS CAPABLE OF REDUCING LEAKAGE CHARGE UNDER THE READ GATE

(75) Inventors: Junzo Sakurai, Koganei (JP); Takayuki Kijima, Akiruno (JP)

(73) Assignee: Olympus Corporation, Tokyo (JP)

(*) Notice: Subject to any disclaimer, the term of this patent is extended or adjusted under 35 U.S.C. 154(b) by 647 days.

(21) Appl. No.: 10/120,946

(22) Filed: Apr. 11, 2002

(65) Prior Publication Data

US 2002/0154236 A1    Oct. 24, 2002

(30) Foreign Application Priority Data

Apr. 23, 2001  (JP) ............................. 2001-124735

(51) Int. Cl.
*H04N 3/14* (2006.01)
(52) U.S. Cl. ......................... 348/312; 348/322
(58) Field of Classification Search ................ 348/311, 348/312, 313, 314, 315, 316, 317, 319, 322, 348/320, 362, 221.1, 296, 248, 249; 257/291, 257/292, 242, 232, 221; 250/208.1
See application file for complete search history.

(56) References Cited

U.S. PATENT DOCUMENTS

| 4,581,539 | A   | * | 4/1986  | Kimata ........................ 348/322 |
| 5,239,380 | A   | * | 8/1993  | Yokoyama ................... 348/319 |
| 5,801,409 | A   | * | 9/1998  | Nam ............................ 257/233 |
| 6,198,507 | B1  | * | 3/2001  | Ishigami ..................... 348/273 |
| 6,515,703 | B1  | * | 2/2003  | Suzuki et al. ................ 348/317 |
| 6,628,328 | B1  | * | 9/2003  | Yokouchi et al. ........... 348/312 |
| 6,707,499 | B1  | * | 3/2004  | Kung et al. ................. 348/312 |
| 6,778,214 | B1  | * | 8/2004  | Toma .......................... 348/314 |
| 6,825,879 | B1  | * | 11/2004 | Furumiya .................... 348/311 |
| 2002/0154236 | A1 | * | 10/2002 | Sakurai et al. .............. 348/312 |

FOREIGN PATENT DOCUMENTS

| JP | 02-161880 | 6/1990 |
| JP | 09-093491 | 4/1997 |

* cited by examiner

*Primary Examiner*—Aung Moe
(74) *Attorney, Agent, or Firm*—Volpe and Koenig, P.C.

(57) ABSTRACT

According to a driving method for an interline type CCD imaging device, the voltage level to be applied to a channel electrode in a vertical charge transfer line to which at least one photodiode is connected is controlled to form a shallower potential well just in the channel. At least the voltage levels applied to channel electrodes in the VCCD connected to the PDs are controlled such that potential wells formed within respective channels becomes shallower.

7 Claims, 15 Drawing Sheets

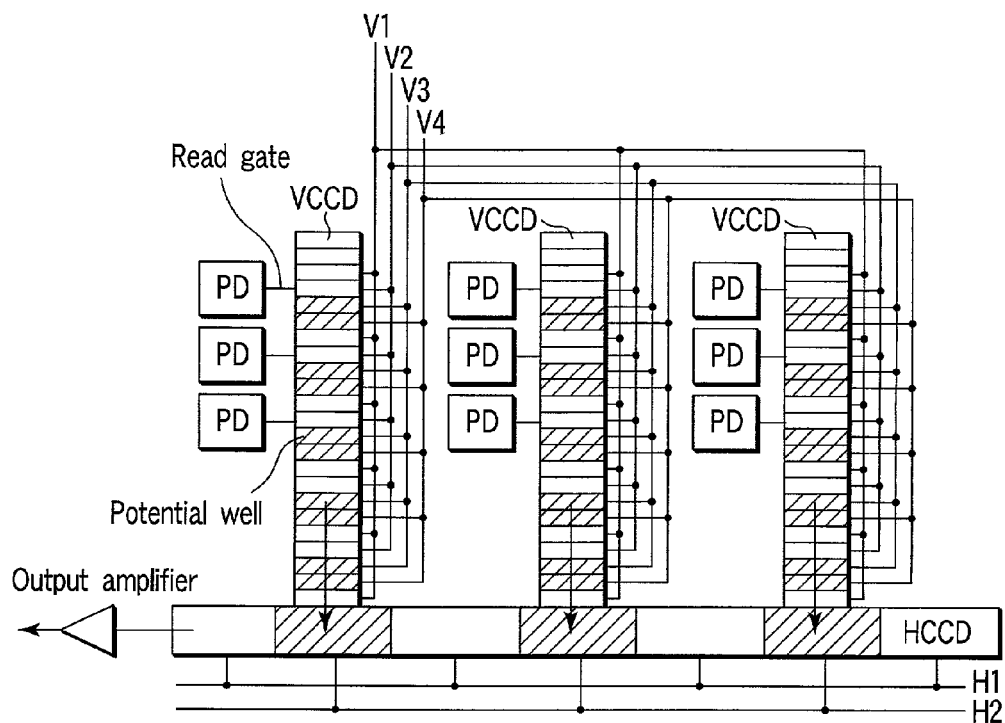
F I G. 6
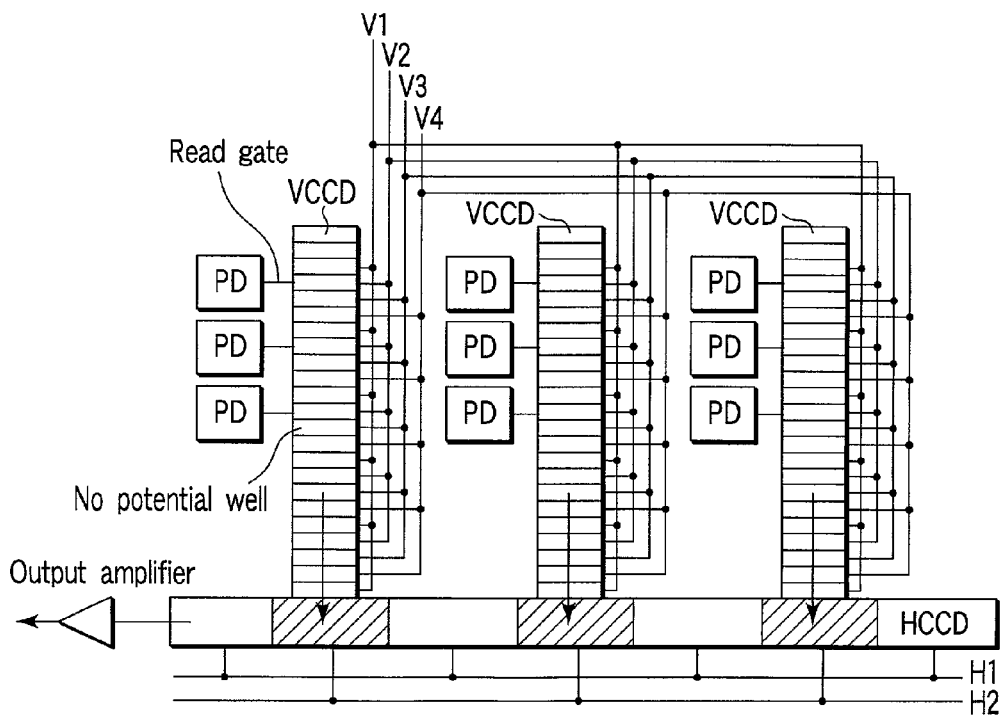
F I G. 7

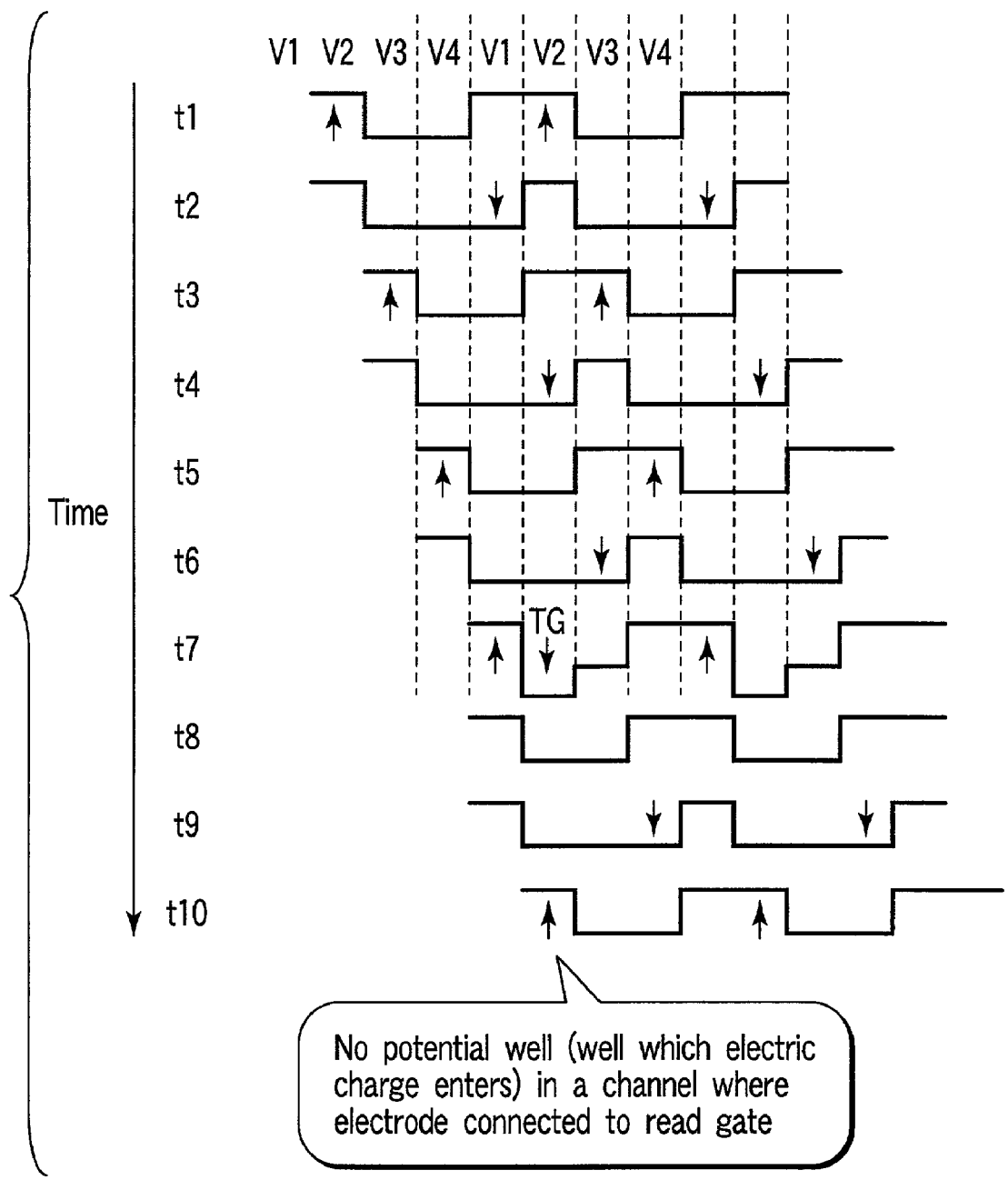
F I G. 9

SOLID-STATE IMAGING APPARATUS CAPABLE OF REDUCING LEAKAGE CHARGE UNDER THE READ GATE

CROSS-REFERENCE TO RELATED APPLICATIONS

This application is based upon and claims the benefit of priority from the prior Japanese Patent Application No. 2001-124735, filed Apr. 23, 2001, the entire contents of which are incorporated herein by reference.

BACKGROUND OF THE INVENTION

1. Field of the Invention

The present invention relates to an imaging apparatus for taking pictures of an object using a solid-state imaging device such as a CCD, a drive unit for driving the same solid-state imaging device and a driving method therefor.

2. Description of the Related Art

In recent years, various kinds of digital cameras for taking pictures of an object using a solid-state imaging device such as a CCD have been developed. There are various types of CCDs. FIG. 1 shows a typical CCD configuration. This CCD comprises two-dimensionally arrayed photoelectric conversion devices (photodiode PDs), a read gate, a vertical charge transfer line (VCCD), a horizontal charge transfer line (HCCD) and an output amplifier.

When vertical transfer of signal charge is executed through the VCCD according to four-phase driving method, one of four vertical charge transfer electrodes (V1, V2, V3, V4) provided for each photoelectric conversion device PD, for example, V2 is connected to a corresponding photoelectric conversion device PD through the read gate. The vertical charge transfer electrode V2 acts as a gate electrode of the read gate at the same time. When a charge transfer pulse (TG), which is a higher voltage driving pulse than an ordinary driving pulse for vertical charge transfer is applied to the vertical charge transfer electrode V2, electric charge can be transferred from the photoelectric conversion device PD composing pixels to the vertical charge transfer line VCCD.

An electrode position indicated as shading in FIG. 1 indicates that electric charge is currently accumulated in a channel under that electrode. Ordinarily, the VCCD is stopped in a period of the horizontal charge transfer, which executes transferring electric charge through the HCCD. Thus, in that period, signal charges of each pixel are accumulated and held in two serial vertical charge electrodes V2, V3 separately. Electric charges accumulated in the two vertical charge electrodes V2, V3 are shifted by four each in the vertical direction each time when vertical charge transfer is executed by a cycle and transferred to next vertical charge electrodes V2, V3 of the same phase.

FIG. 2 shows a conventional typical driving waveform for vertical transfer and horizontal transfer and FIG. 3 shows changes in potential of each channel under the vertical charge transfer electrodes V1, V2, V3, and V4 of this case.

Three kinds of voltages, a negative low voltage L, a positive middle voltage M and a high voltage H higher than the middle voltage M, are applied to the vertical transfer voltage V2. The low voltage L and the middle voltage M are used for vertical transfer in the VCCD. The high voltage H is used for electric charge transfer from the PD to the VCCD.

At time t=t1, a low voltage L is applied to the V1, V4 while the middle voltage M is applied to the V2, V3. Consequently, no potential well is formed under the electrodes V1, V4 and a deep well is formed under the electrodes V2, V3. As a result, channels under the electrodes V1, V4 become potential barriers to block mixing of noise signals from the surrounding. Next, at time t=t2, the voltage of the electrode V4 is raised from L to M. Then, a signal charge is moved from channels under the electrodes V2, V3 to channels under the electrodes V2, V3, and V4 and at time t=3, the voltage of the electrode V2 turns to L while the signal charge is moved to channels under the electrodes V3, V4. By carrying out processing for moving a potential well forming position in the vertical direction in succession, electric charge is moved to channels under the electrodes V2, V3 corresponding to a next photoelectric conversion device PD at time t=9.

Of electric charge transferred vertically as described above, electric charge existing in a channel under an electrode at a bottom end portion of the vertical charge transfer line is moved to the horizontal charge transfer line HCCD. At time t=10, horizontal transfer of electric charge of one line moved to the horizontal charge transfer line is carried out and read out of the imaging device through an output amplifier. By reading out all electric charges of the PD connected to the VCCD in succession, one frame is read out.

Of the four electrodes V1, V2, V3, and V4, the electrode V2 is connected to a read gate for transferring electric charge accumulated in the photoelectric conversion device PD to the vertical charge transfer line VCCD. Then, if a higher voltage H than the middle voltage M at the vertical charge transfer is applied to the electrode V2, electric charge accumulated in the photoelectric conversion device PD is transferred to the VCCD. When the voltage of the electrode V2 is M or L, the channel under the read gate forms a potential barrier thereby blocking electric charge accumulated in the photoelectric charge device PD from flowing into the VCCD. Here, a period of time t1 to t10 is called the horizontal blanking period.

In a first horizontal blanking period of each frame, the high voltage H is applied to the electrode V2 as electric charge transfer pulse TG at time t=9, so that a deep potential well is formed under the electrode V2. Consequently, the read gate turns conductive, so that electric charge is transferred from the PD to the potential well under the electrode V2. The electric charge transferred from the PD to the electrode V2 is held by the V2, V3 in the horizontal transfer period at time t=10 and shifted only by one line in a next horizontal blanking period in the vertical direction. Only the vertical charge transfer is carried out since the second horizontal blanking period but no electric charge is transferred from the PD to the VCCD.

However, the conventional driving system for transferring the signal charge vertically while accumulating and holding the signal charge in the vertical charge transfer electrodes V2, V3 needs to hold electric charges in the electrodes V2, V3 in the horizontal blanking period and a positive middle voltage M continues to be applied to the electrodes V2, V3.

In this case, because the electrode V2 or the read gate electrode is held at plus potential, electron or dark charge induced under the read gate electrode is increased, so that this dark charge flows into the PD thereby worsening signal-to-noise ratio. FIGS. 4A to 4C show this state. The dark charge means the charge which behaves as noise against signal charge.

FIGS. 4A, 4B, and 4C show potentials of a channel under the electrode V2 when the voltages applied to the electrode V2 is M, L, and H, respectively. Conditions in which the voltage applied to the electrode V2 is M, L, and H are expressed in V2=M, V2=L, and V2=H, respectively. When V2=M, a potential well is formed under the electrode V2 as shown in FIG. 4A. In this case, because the silicon substrate surface under the electrode V2 which is the read gate turns to plus potential, the dark charge on the silicon substrate surface under the electrode V2 is increased. Because in the above-described driving system, V2=M is maintained in a period in which the driving of the VCCD is stopped, the dark charge induced by the silicon substrate surface under the electrode V2 is likely to flow into the PD.

On the other hand, when V2=L, as shown in FIG. 4B, no potential well is formed under the electrode V2 and positive holes gathered in a channel under the electrode V2 couple with the dark charges again so that the dark charges decrease, thereby providing no problem.

BRIEF SUMMARY OF THE INVENTION

An object of the present invention is to provide an imaging apparatus, a drive unit of a solid-state imaging device and a driving method therefor capable of raising the signal-to-noise ratio.

To achieve the above object, according to a first aspect of the present invention, there is provided an imaging apparatus comprising: a lens; a photoelectric conversion device to generate and accumulate electric charges corresponding to light amount of an object inputted through the lens, the photoelectric conversion device having photoelectric conversion elements which are arranged two-dimensionally; a vertical charge transfer line which transfers the electric charges generated in the photoelectric conversion device vertically; a read gate which transfers electric charges accumulated in the photoelectric conversion device to the vertical charge transfer line; a read gate electrode to control the read gate; an m-phase (m is an integer of 2 or more) vertical transfer electrode which transfers the electric charges along the vertical charge transfer line; a horizontal charge transfer line which transfers the electric charges transferred through the vertical charge transfer line; a horizontal charge transfer line which transfers the electric charges transferred through the vertical charge transfer line; a horizontal transfer electrode which transfers the electric charges along the horizontal charge transfer line; and a driving circuit which applies a driving pulse to the vertical transfer electrodes and the horizontal transfer electrode, wherein the read gate is connected to a predetermined electrode of the m-phase vertical transfer electrodes and the voltage applied to the vertical transfer electrode, connected to the read gate, is set to be a low voltage in a horizontal transfer period by the horizontal charge transfer line without forming a potential well at least under the vertical transfer electrode connected to the read gate.

According to a second aspect of the present invention, there is provided a drive unit for driving a solid-state imaging device having a photoelectric converting portion, vertical/horizontal charge transfer lines and a read gate to read out electric charges accumulated in the photoelectric converting portion, wherein the read gate is connected to a predetermined vertical transfer electrode of a m-phase (m is an integer of 2 or more) vertical transfer electrodes composing the vertical charge transfer line, and in the vertical charge transfer line driving stop period, the voltage applied to the vertical transfer electrode connected to the read gate is set to be a low voltage without forming a potential well at least under the vertical transfer electrode connected to the read gate.

According to a third aspect of the present invention, there is provided a method of driving an interline type CCD imaging device which comprises a plurality of photodiodes arrayed in rows and columns, one horizontal charge transfer line, a plurality of vertical charge transfer lines driven in at least two phases, and a read gate, and in which the read gate connects the photodiodes to the channel electrode of at least one vertical charge transfer line driven in a specific phase, wherein during at least any one operation of photoelectric charge accumulation in the photodiode and execution of the horizontal transfer operation, the voltage level applied to the channel electrode in the vertical charge transfer line at least to which the photodiode is connected is controlled to form a shallower potential well just under the channel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiment given below, serve to explain the principles of the invention.

FIG. 6 is a diagram for explaining the configuration of an imaging device for use in the imaging apparatus and a driving of the vertical charge transfer line according to this embodiment;

FIG. 7 is a diagram for explaining a second example of the structure of the imaging device for use in the imaging apparatus and a driving operation of a vertical charge transfer line according to this embodiment;

FIG. 9 is a diagram showing changes in potential under the vertical transfer electrode corresponding to the driving waveform of FIG. 8;

DETAILED DESCRIPTION OF THE INVENTION

Hereinafter, the preferred embodiments of the present invention will be described with reference to the accompanying drawings.

Figure 5:
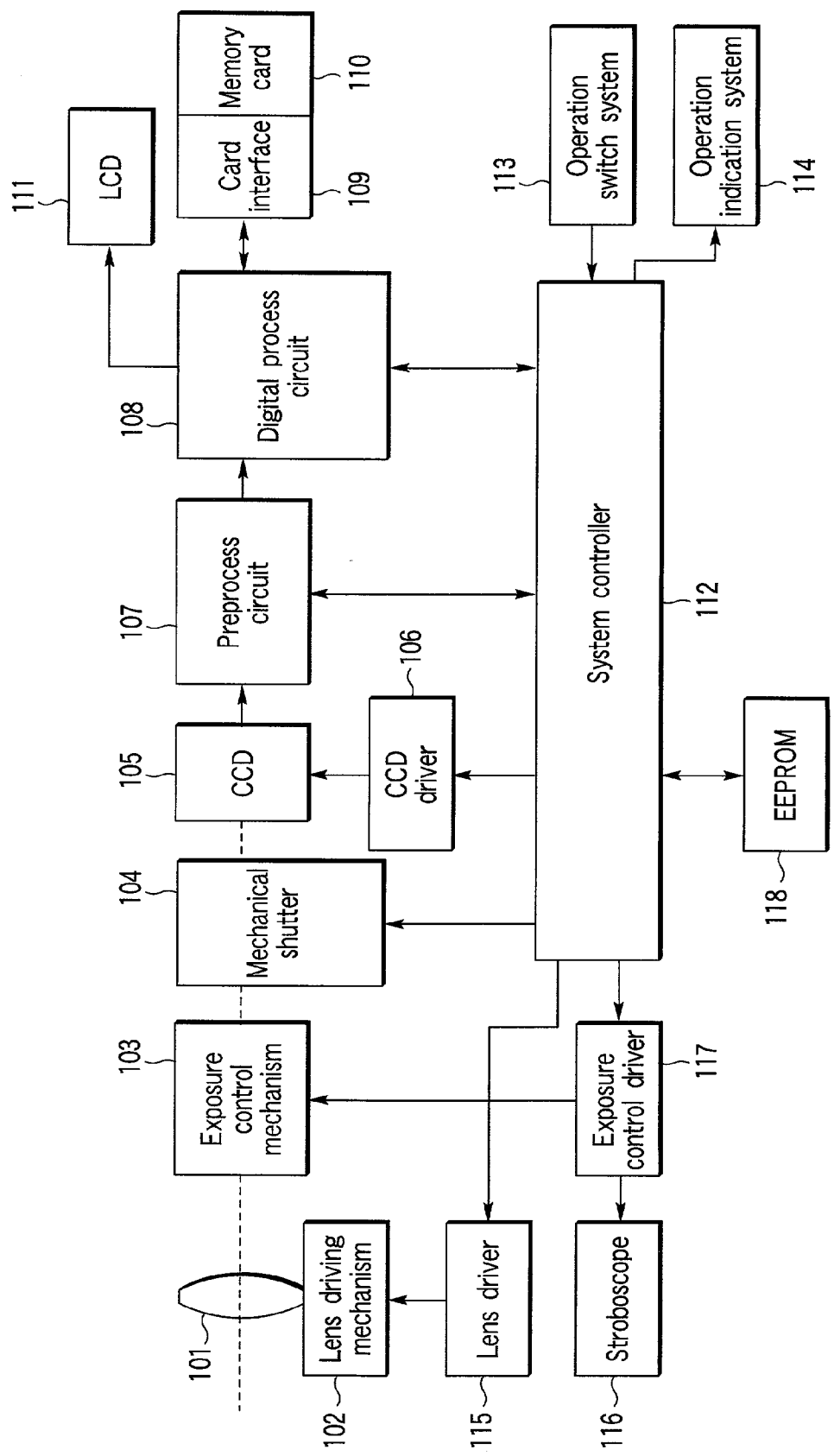
FIG. 5 is a block diagram showing the configuration of an imaging apparatus according to an embodiment of the present invention.

FIG. 5 shows the structure of an imaging apparatus according to an embodiment of the present invention. A case where the present invention is embodied in the form of a digital camera will be described here.

This digital camera comprises an lens system 101 composed of various kinds of lenses, a lens driving mechanism 102 for driving the lens system 101, an exposure control mechanism 103 for controlling the diaphragm of the lens system 101, a mechanical shutter 104, a CCD color imaging device 105 incorporating a color filter, a CCD driver 106 for driving the imaging device 105, a pre-process circuit 107 including an analog-to-digital converter and the like, a digital process circuit 108 for executing color signal generation processing, matrix conversion processing and other various kinds of digital processing, a card interface 109, a memory card 110 and the LCD image display system 111.

This digital camera further comprises a system controller (CPU) 112 for controlling respective parts integrally, an operation switch system 113 composed of various kinds of operation buttons, an operational indication system 114 for indicating operation states, mode states and the like, a lens driver 115 for controlling the lens driving mechanism 102, a stroboscope 116 as light emitting means, an exposure control driver 117 for controlling the stroboscope 116 and the exposure control mechanism 103 and a nonvolatile memory (EEPROM) 118 for storing information about various kinds of settings.

In the digital camera of this embodiment, the system controller 112 controls its entire system integrally. The system controller 112 controls driving of the mechanical shutter 104 and the CCD imaging device 105 composed of the CCD driver 106 so as to execute exposure (charge accumulation) and read out signal. The system controller 112 fetches read-out signal into the digital process circuit 108 through the pre-process circuit 107. After carrying out various kinds of signal processing, it is recorded in the memory card 11 through the card interface 109.

The driving control of the CCD imaging devices 105 is carried out using various kinds of driving signals outputted from the CCD driver 106 (vertical driving pulse, horizontal driving pulse, a substrate voltage VSUB and the like). The CCD imaging device 105 for use has, for example, an interline type vertical overflow drain (VOFD) structure. The substrate voltage VSUB is a substrate bias voltage for determining an overflow level OFL which is a maximum charge accumulation level of each photoelectric conversion device PD. By overlaying VSUB pulse, which is a large value pulse on this VSUB to emit electric charge of each PD directly to the substrate, each PD can be initialized.

FIG. 6 shows the configuration of the CCD imaging device 105. The CCD imaging device 105 comprises a photodiode, which is two-dimensionally arrayed photoelectric conversion device, a read gate, a vertical charge transfer line VCCD, a horizontal charge transfer line HCCD, an output amplifier and the like. Here, it is expected that the vertical transfer by the VCCD is executed by four-phase driving while the horizontal transfer by the HCCD is executed by two-phase driving.

When the vertical transfer for transferring electric charge through the VCCD is executed by the four-phase driving, four vertical transfer electrodes (V1, V2, V3, V4) are disposed at positions corresponding to the respective photoelectric conversion devices PD as shown in FIG. 6. Of the four vertical transfer electrodes, one, for example, the V2 is connected to the corresponding photoelectric conversion device PD through the read gate. The vertical transfer electrode V2 serves for a gate electrode of the read gate also. By applying charge transfer pulse TG which is a higher voltage driving pulse than ordinary driving pulse for the vertical transfer to the vertical transfer electrode V2, electric charge can be transferred from the photoelectric conversion device PD composing the pixel to the vertical charge transfer line VCCD.

The vertical transfer through the VCCD is executed periodically once in a single horizontal blanking period. Electric charge of a single line transferred to the HCCD in a single horizontal blanking period by the vertical transfer is transferred horizontally and read out to the preprocess circuit 107 through the output amplifier.

The electrode position indicated as shading in FIG. 6 indicates that currently electric charges are accumulated in that channel. Ordinarily, driving of the VCCD is stopped in the horizontal transfer period through the HCCD. Thus, in that period, signal charges of each PD are distributed to two serial vertical transfer electrodes and accumulated therein. According to this embodiment, electric charges are kept not held in a channel under a vertical transfer electrode V2 adjacent to the PD in a long period. For this reason, the vertical transfer of the signal charge is carried out while the charge is accumulated in the vertical transfer electrodes V3, V4 as shown in FIG. 6 but not in the vertical transfer electrodes V2, V3 as is conventional. That is, in the horizontal transfer period or the like in which the transfer of VCCD is stopped temporarily, a positive middle voltage M is applied to the vertical transfer electrodes V3, V4 while a negative low voltage L is applied to the vertical transfer electrodes V2, V1. Consequently, electric charges are accumulated in the potential wells formed under the vertical transfer electrodes V3, V4 and no potential well is formed under the vertical transfer electrodes V2, V1 to provide a, potential barrier. In the horizontal transfer period or the like in which the transfer through the VCCD is stopped, the vertical transfer electrode V2, which is a read gate electrode adjacent to the PD, is set up to the low voltage L so that positive holes are gathered in a channel under the electrode V2. If the positive holes couple with electrons which are dark charges, the dark charges under the read gate electrode decrease. Thus, inflow of the dark charges from under the read gate electrode into the PD vanishes thereby decreasing dark current noise.

FIG. 7 shows an example in which to stop the driving of the vertical charge transfer line VCCD, not only the vertical electrode V2 but also all the four-phase vertical transfer electrodes V1, V2, V3, and V4 are set up to the low voltage L by means of the CCD driver 106.

In this case, no potential well is formed in any of the vertical electrodes V1, V2, V3, and V4. Thus, the signal charge cannot be held in the vertical charge transfer line driving stop period. However, readout of the signal charge is unnecessary principally except at the time of reading out meaningful signal charges such as signal charges obtained through this imaging. Therefore, the driving of the vertical charge transfer line VCCD can be stopped by setting all the vertical transfer electrodes V1, V2, V3, and V4 to the low voltage L except at the time of reading out the signal charge. Consequently, power consumption in the vertical transfer driving stop period can be reduced and the inflow of the dark current from any vertical transfer electrode to the PD can be blocked.

That is, although basically, the inflow of the dark charge from the VCCD into the PD can be blocked by applying the low voltage L to the electrode V2 when the vertical transfer is stopped, the inflow of the dark charge into the PD can be blocked securely not depending on the structure of the CCD but by applying the low voltage L to all the electrodes V1 to V4.

Next, the driving waveforms for the vertical transfer and horizontal transfer corresponding to FIG. 7 and changes in potential in each channel under the electrodes V1, V2, V3, and V4 in this case will be described with reference to FIGS. 8 and 9.

Three types of voltages, the negative low voltage L, the positive middle voltage M and the high voltage H, which is higher than the middle voltage M are applied to the vertical transfer electrode V2. The low voltage L and the middle voltage M are used for the vertical transfer by the VCCD while the high voltage H is used for charge transfer from the PD to the VCCD.

Figure 8:
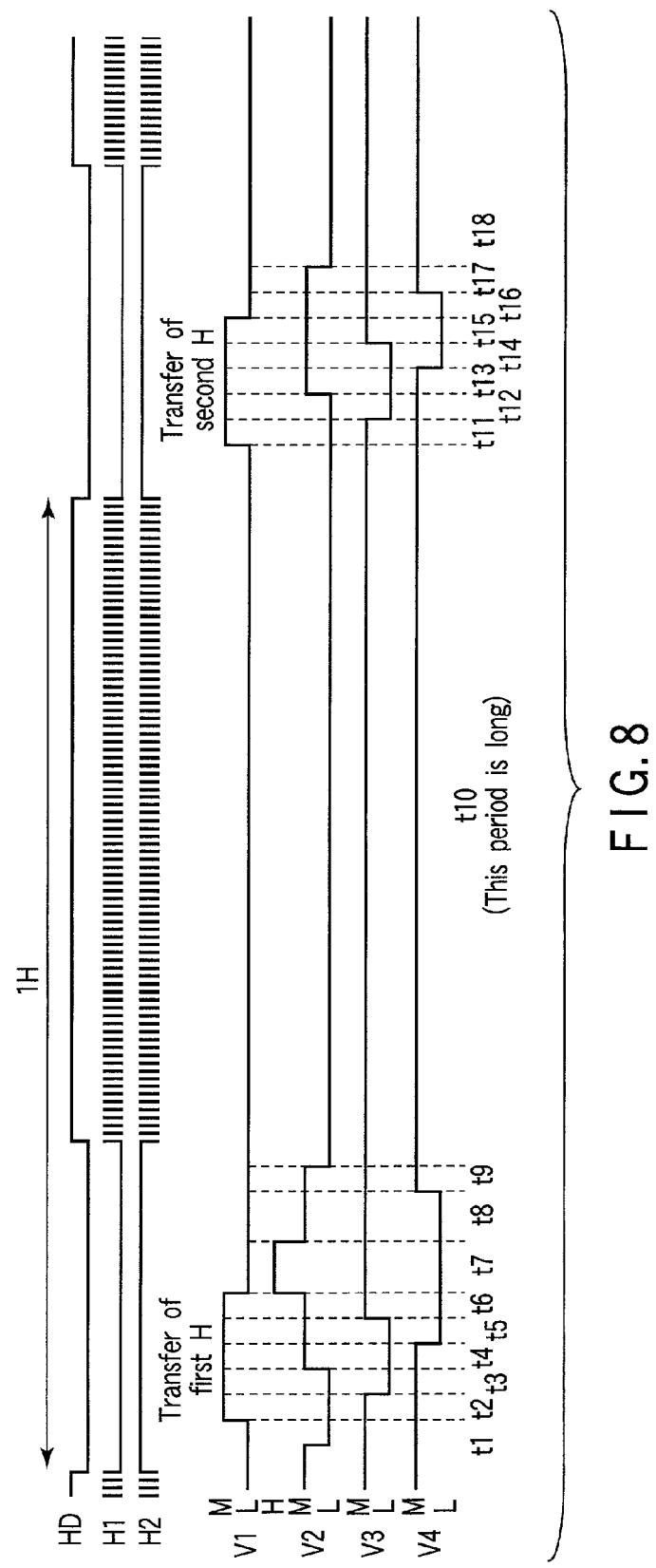
FIG. 8 is a timing chart indicating driving waveforms for vertical and horizontal transfers for use in this embodiment.

In FIG. 8, HD indicates a pulse for horizontal synchronization. In a horizontal transfer period specified by this HD, the horizontal transfer through the HCCD by horizontal driving pulses H1, H2 based on the two-phase driving system is carried out. In the horizontal transfer period, as described above, the vertical transfer is stopped with the low voltage L applied to the vertical transfer electrodes V1, V2 and the middle voltage M applied to the electrodes V3, V4. Thus, the vertical transfer in the horizontal blanking period is started with always the low voltage L applied to the vertical transfer electrodes V1, V2 and the middle voltage M applied to the electrodes V3, V4.

In the first horizontal blanking period of each frame, the state at time t=t1 is equal to the period in which the vertical transfer driving is stopped, so that the low voltage L is applied to the electrodes V1, V2 while the middle voltage M is applied to the electrodes V3, V4. In this case, as shown in FIG. 9, the potential wells are formed under the electrodes V3, V4 in order to accumulate the signal charges. Next, the voltage of the electrode V1 is raised from L to M at time t=t2 while holding the potential barrier of the electrode V2. Consequently, the potential well is spread from under the electrodes V3, V4 up to under V3, V4, and V1. At time t=3, the voltage of the electrode V3 becomes L and the signal charge moves to under the electrodes V4, V1. Next, at time t=t4, the voltage of the electrode V2 is raised from L to M while holding the potential barrier of the electrode V3. Consequently, the potential well is spread from under the electrodes V4, V1 up to under the electrodes V4, V1, and V2. At time t=5, the voltage of the electrode V4 becomes L and the signal charge moves to under the electrodes V1, V2. Next, at time t=t6, the voltage of the electrode V3 is raised from L to M while holding the potential barrier of the electrode V4. Then, the potential well is spread from under the electrodes V1, V2 to under the electrodes V1, V2, and V3. At time t=7, the voltage of the electrode V1 becomes L and the signal charge moves to under the electrodes V2, V3.

Further, if the high voltage H is applied to the electrode V2 as a charge transfer pulse at time t=7, a deep potential well is formed under the electrode V2. As a result, the read gate becomes conductive and electric charge is transferred to a potential well under the electrode V2 from the PD. Next, the voltage of the electrode V2 is changed from H to M at time t=8 and the read gate is closed. At time t=9, the voltage of the electrode V4 is raised from L to M while holding the potential barrier of the electrode V1. Consequently, the potential well is spread from under the electrodes V2, V3 to under the electrodes V2, V3, and V4. At time t=10, the voltage of the electrode V2 becomes L and the signal charge moves to under the electrodes V3, V4.

With this state (V1=L, V2=L, V3=M, V4=M), the horizontal transfer by horizontal transfer pulses H1, H2 is carried out. The vertical transfer is halted in this period. The same vertical transfer processing as the above-described time t2 to t7 is executed at time t11 to t16 in a second horizontal blanking period. As a result, of the signal charges transferred from each PD to the VCCD at the time t7 in the first horizontal blanking period, electric charge accumulated in the PD at the bottom end of the VCCD is transferred to the horizontal charge transfer line HCCD. Then, the same vertical transfer processing as the above-described time t9, t10 is executed at time t17, t18, so that electric charges from each PD is moved to channels under the electrodes V3, V4 corresponding to a PD of a next line.

As described above, the electric charge transferred from each PD to channels under the electrodes V2, V3 are transferred to channels under the electrodes V3, V4 in the first horizontal blanking period and electric charges accumulated in channels under the electrodes V3, V4 are transferred up to channels under the electrodes V3, V4 of the next line since the second horizontal blanking period. By executing such vertical transfer driving, the electrode V2 adjacent the PD can be set to the low voltage V2 during the horizontal transfer which takes a relatively long-time.

Next, an example of imaging sequence at the time of long-time exposure will be described as an example of application of the vertical transfer driving system of FIG. 8, with reference to FIG. 10.

Figure 10:
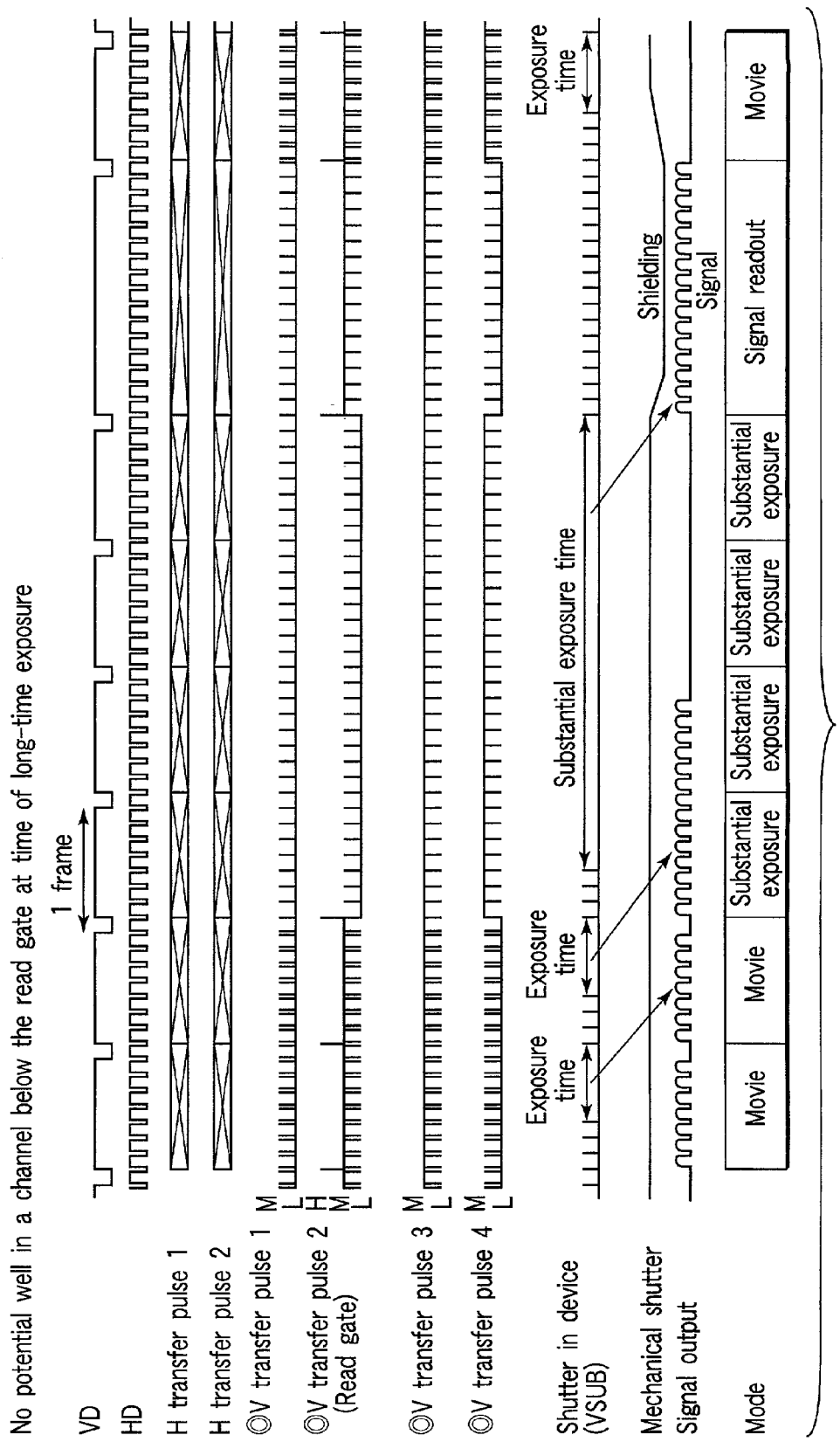
FIG. 10 is a timing chart showing a first example of imaging sequence at long-time exposure for use in this embodiment.

In FIG. 10, VD indicates a vertical synchronous signal. This signal can be called start reference signal for one frame operation because this VD is reset corresponding to requirement. Further, because the H transfer pulses 1, 2 correspond to the above-described horizontal transfer pulses H1, H2, its detailed waveform is not indicated in FIG. 10. The V transfer pulses 1, 2, 3, and 4 correspond to the vertical driving pulses which are applied to the above-described vertical transfer electrodes V1, V2, V3, and V4.

The charge accumulation time of the PD which means an exposure time is specified by a time until the high voltage H is applied to the vertical transfer electrode V2 after electric charges are discharged from all the PDs by the VSUB pulse.

When the photographing mode is movie mode, exposure for displaying electronic viewfinder (EVF) or the like and signal readout are executed repeatedly synchronously with the VD. In FIG. 10, a correspondence between the exposure time and signal output is indicated with an arrow. This example indicates a case in which the driving of the VCCD is carried out according to the conventional driving method described in FIG. 3 in which the signal charges corresponding to one line are transferred directly in each horizontal blanking period while holding the signal charges in the vertical electrodes V2, V3. In this case, the vertical transfer electrodes V2, V3 are maintained at the middle voltage M by the V transfer pulses 2, 3 in the horizontal transfer period, while the vertical transfer electrodes V1, V4 are maintained at the low voltage L by the V transfer pulses 1, 3. That is, V2, V3=M, V1, V4=L is used as default state at the time when the VCCD driving is stopped.

Substantial exposure mode which starts up substantial exposure for photographing is gained just when a shutter trigger which is a photographing start instruction, is inputted or the like. Electric charges corresponding to a light amount on an object at that time are accumulated in each PD.

In this substantial exposure mode, the driving of the VCCD is changed over to the driving system of FIG. 8 in order to raise the signal-to-noise ratio of the imaging signal while blocking the inflow of the dark charges from the VCCD into the PD. That is, the signal charges of one line are transferred vertically in each horizontal blanking period while accumulating and holding the signal charges in the vertical electrodes V3, V4 not in the vertical transfer electrodes V2, V3. As described above, in the horizontal transfer period, the vertical transfer electrodes V3, V4 are maintained at the middle voltage M by the V transfer pulses 3, 4, while the vertical transfer electrodes V1, V2 are maintained at the low voltage L by the V transfer pulses 1, 2. That is, V3, V4=M V1 and, V2=L is a default state at the time when the VCCD driving is stopped. After the high voltage VSUB pulse is outputted to discharge the vertical charge transfer line and the PD of unnecessary electric charges, the substantial exposure or accumulation of electric charges into the PD is started.

In a former half of the exposure period under the substantial exposure mode, the signal charge obtained by the exposure under movie mode is read out and in a latter half thereof, substantially empty signal readout is carried out.

When a predetermined exposure time elapses after a final VSUB pulse is outputted or a valve imaging termination trigger is inputted, the V transfer pulse 2, which is the high voltage H, is applied to the vertical transfer electrode V2, so that the signal charge from each PD to the VCCD is carried out. After that, the readout mode is gained to execute the vertical transfer and the horizontal transfer for reading out the signal charges obtained by the substantial exposure. In case of the vertical transfer under this readout mode, the driving of the VCCD is carried out also according to the conventional driving system described in FIG. 3 in which the signal charges corresponding to one line are transferred vertically in each horizontal blanking period while accumulating and holding the signal charges in the vertical electrodes V2, V3. When readout mode is selected, the mechanical shutter 104 is closed to prevent so-called vertical noise from being mixed due to an influence of smear or the like.

In the above example, the vertical transfer driving system of FIG. 8 is employed only while electric charges are accumulated in the PD and the conventional driving system is used before and after that period. The reason is that a practically sufficient signal-to-noise ratio can be secured if the inflow of the dark charge from the VCCD into the PD is prevented only in the substantial exposure period. It is needless to say that the vertical transfer driving system of FIG. 8 may be used not only in the substantial exposure period but also before and after that period.

Figure 11:
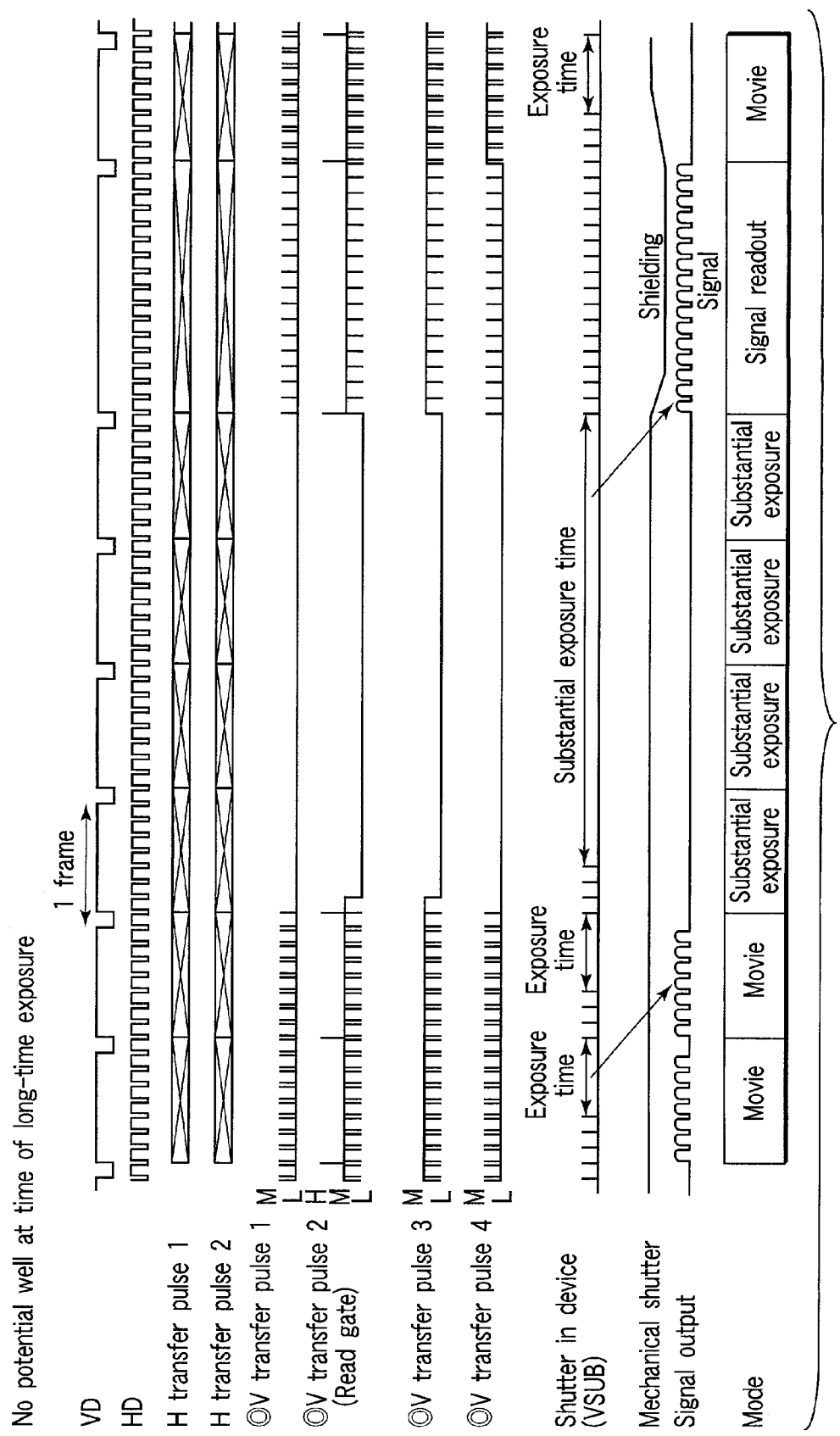
FIG. 11 is a timing chart showing a second example of imaging sequence at long-time exposure for use in this embodiment.
Figure 12:
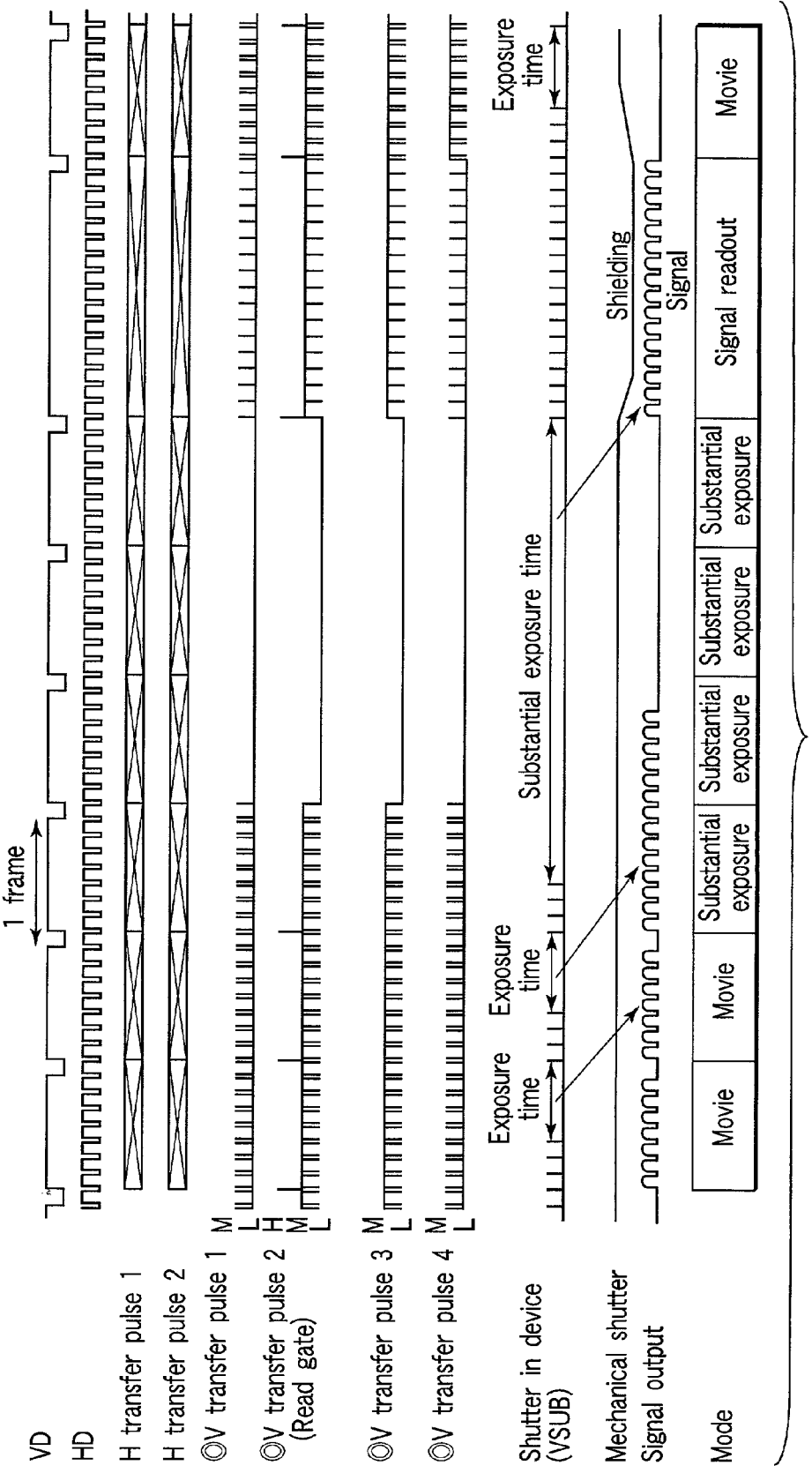
FIG. 12 is a timing chart showing a third example of imaging sequence at long-time exposure for use in this embodiment.

The reason why the vertical/horizontal transfer is carried out in the substantial exposure period is for EVF display or empty readout of the electric charges as described above. Therefore, in that period, the vertical transfer may be stopped with the low voltage L applied to all the vertical transfer electrodes V1, V2, V3, and V4 as described in FIG. 7. FIG. 11 shows an example of the photographing sequence of this example.

Figure 1:
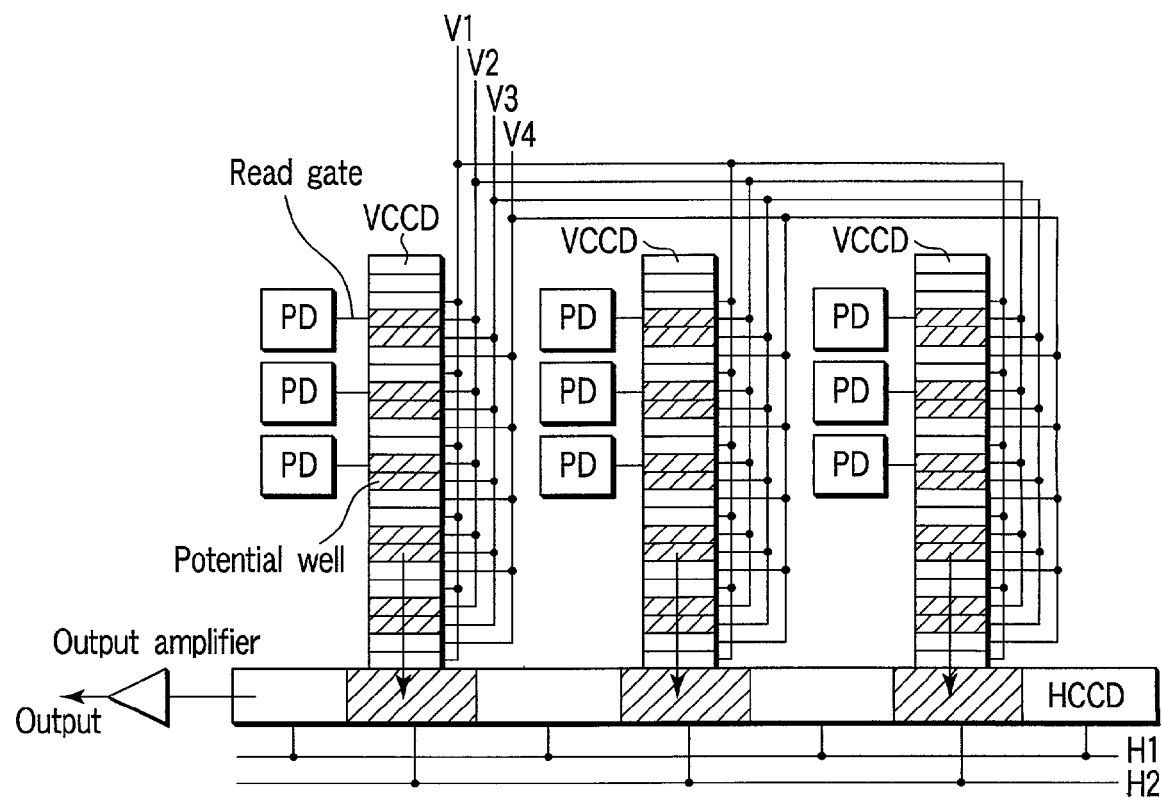
FIG. 1 is a diagram for explaining a conventional typical vertical transfer operation.
Figure 2:
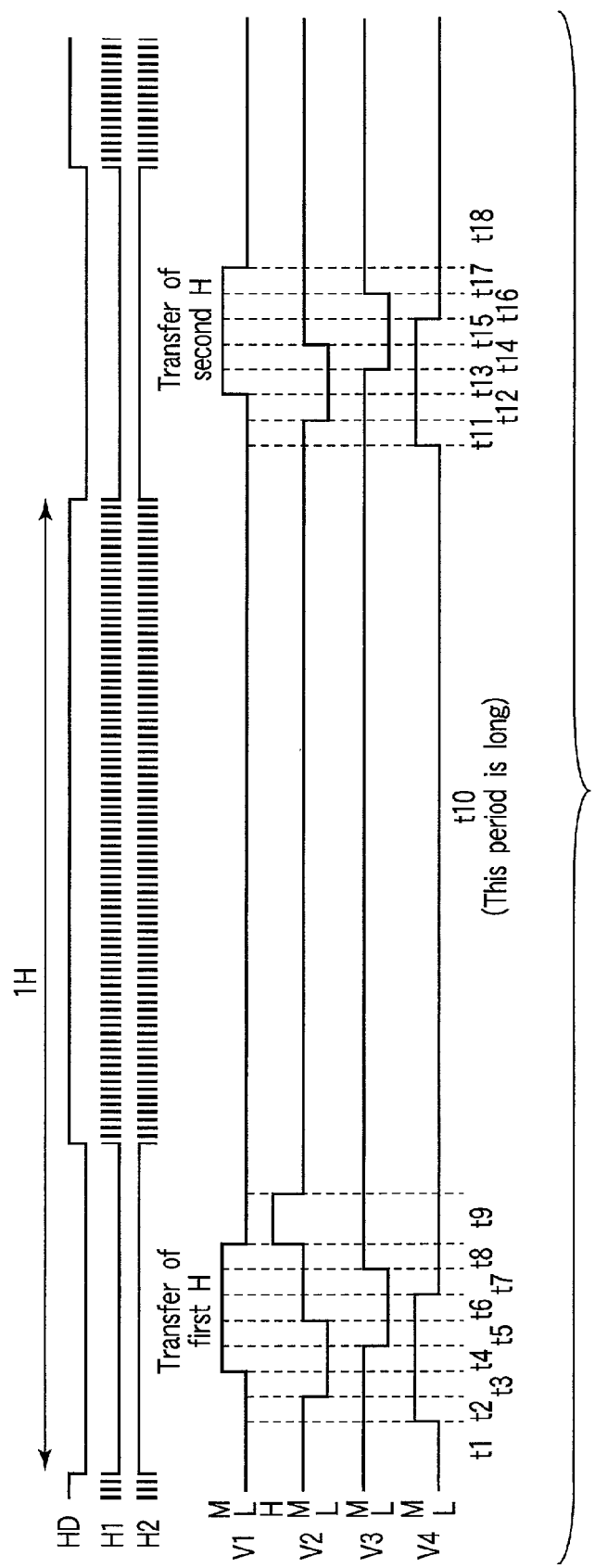
FIG. 2 is a timing chart showing driving waveforms of conventional typical vertical and horizontal transfers.
Figure 3:
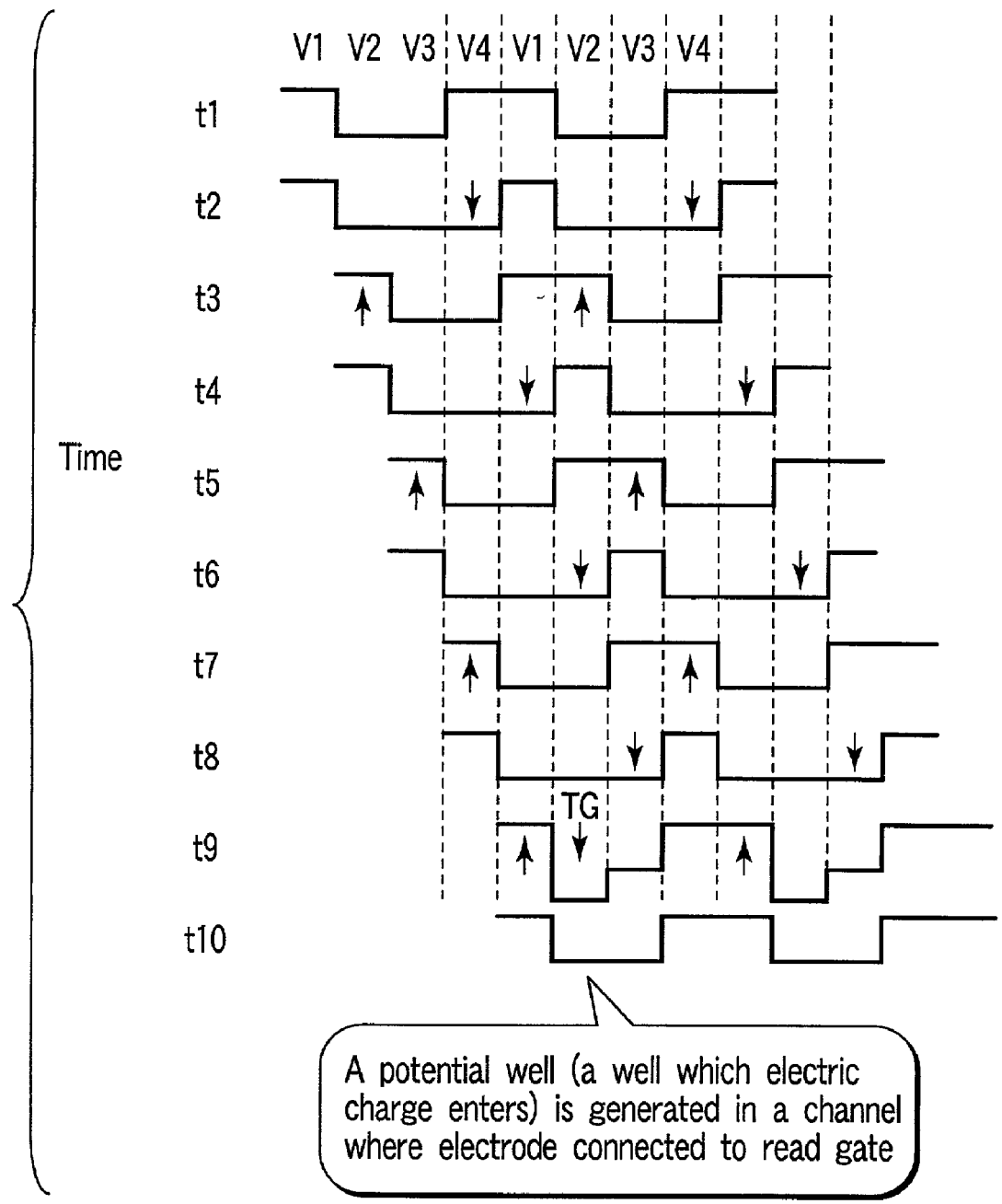
FIG. 3 is a diagram showing changes in potential under a vertical charge transfer electrode corresponding to the driving waveform of FIG. 2.
Figure 4A:
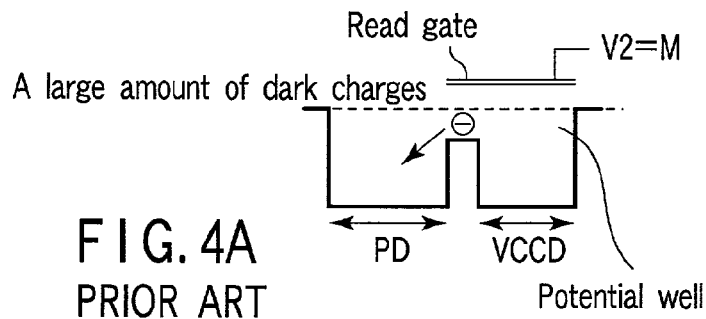
FIGS. 4A, 4B, and 4C are diagrams for explaining inflow of dark charge from the read gate to a photodiode.
Figure 4B:
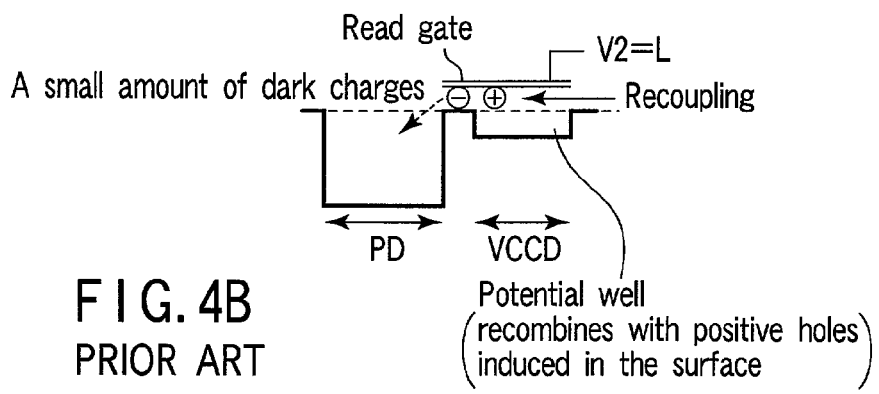
Figure 4C:
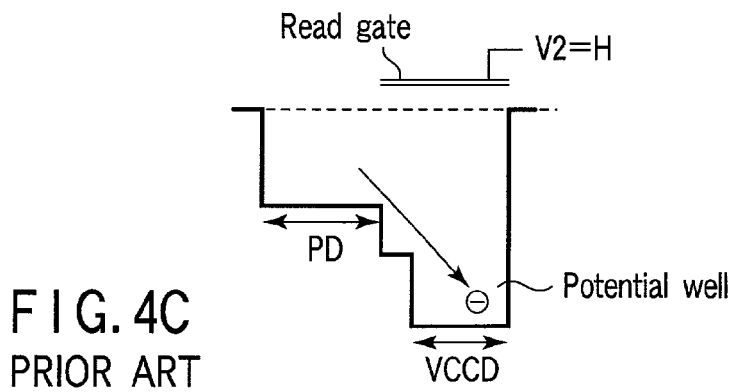

In the movie mode period, the driving of the VCCD is executed according to the conventional driving system described in FIG. 3 in which the signal charges of one line are transferred vertically in each horizontal blanking period while accumulating and holding the signal charges in the vertical electrodes V2, V3. Then, the substantial exposure mode which starts up an exposure for the substantial imaging is gained just when a shutter trigger which is a photographing start instruction, is inputted or the like. Under the substantial exposure mode, the voltage to be applied to the V2, V3 is changed from M to L in a condition that V1, V4=L and V2 V3=M in order to raise the signal-to-noise ratio of the imaging signal while blocking the inflow of the dark charge from the VCCD into the PD and with this condition, the vertical transfer is stopped.

Then, the high voltage VSUB pulse is outputted. After unnecessary electric charges are discharged from the vertical charge transfer line and the PD, the substantial exposure or accumulation of electric charge into the PD is started. That is what we call an electronic shutter. When a predetermined exposure time elapses after a final VSUB pulse is outputted or a bulb imaging termination trigger is inputted, the V transfer pulse 2, which is the high voltage H, is applied to the vertical transfer electrode V2 so as to transfer the signal charge from each PD to the VCCD. After that, the readout mode is gained so as to execute the vertical transfer and the horizontal transfer for reading out the signal charges obtained by the substantial exposure. In case of this vertical transfer under the readout mode, the driving of the VCCD is carried out according to the conventional driving system described in FIG. 3 in which the signal charges of one line are transferred vertically in each horizontal blanking period while accumulating and holding the signal charges in the vertical transfer electrodes V2, V3. In the readout mode period, the mechanical shutter 104 is kept closed to protect against an influence of smear or like as described above.

In the substantial exposure period, the driving of all the vertical transfer electrodes V1, V2, V3, and V4 is stopped and maintained at the low voltage L in order to eliminate wasted power consumption by the vertical transfer driving and prevent the inflow of the dark charge from the VCCD into the PD.

Figure 13:
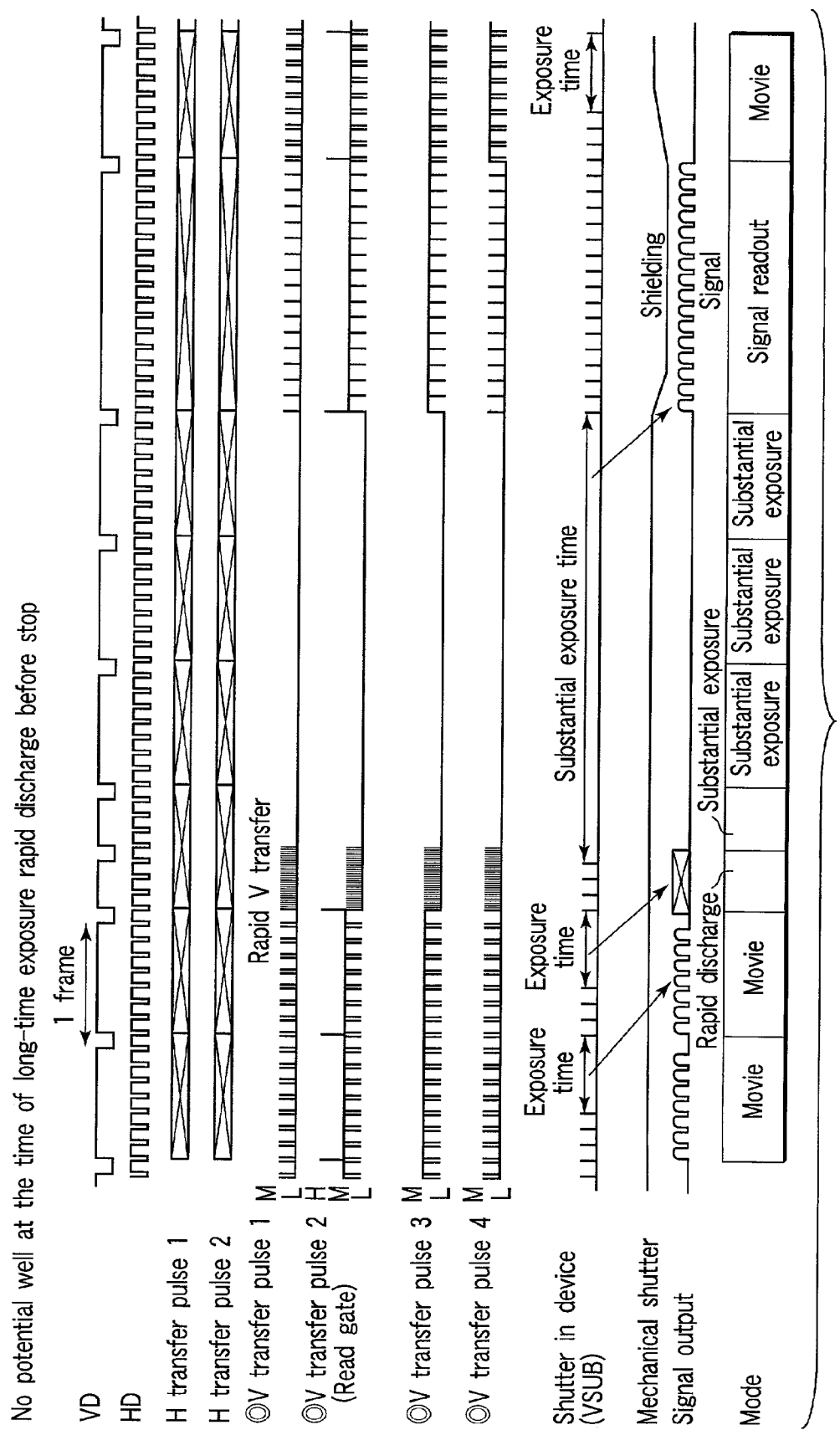
FIG. 13 is a timing chart showing a fourth example of imaging sequence at long-time exposure for use in this embodiment.
Figure 14:
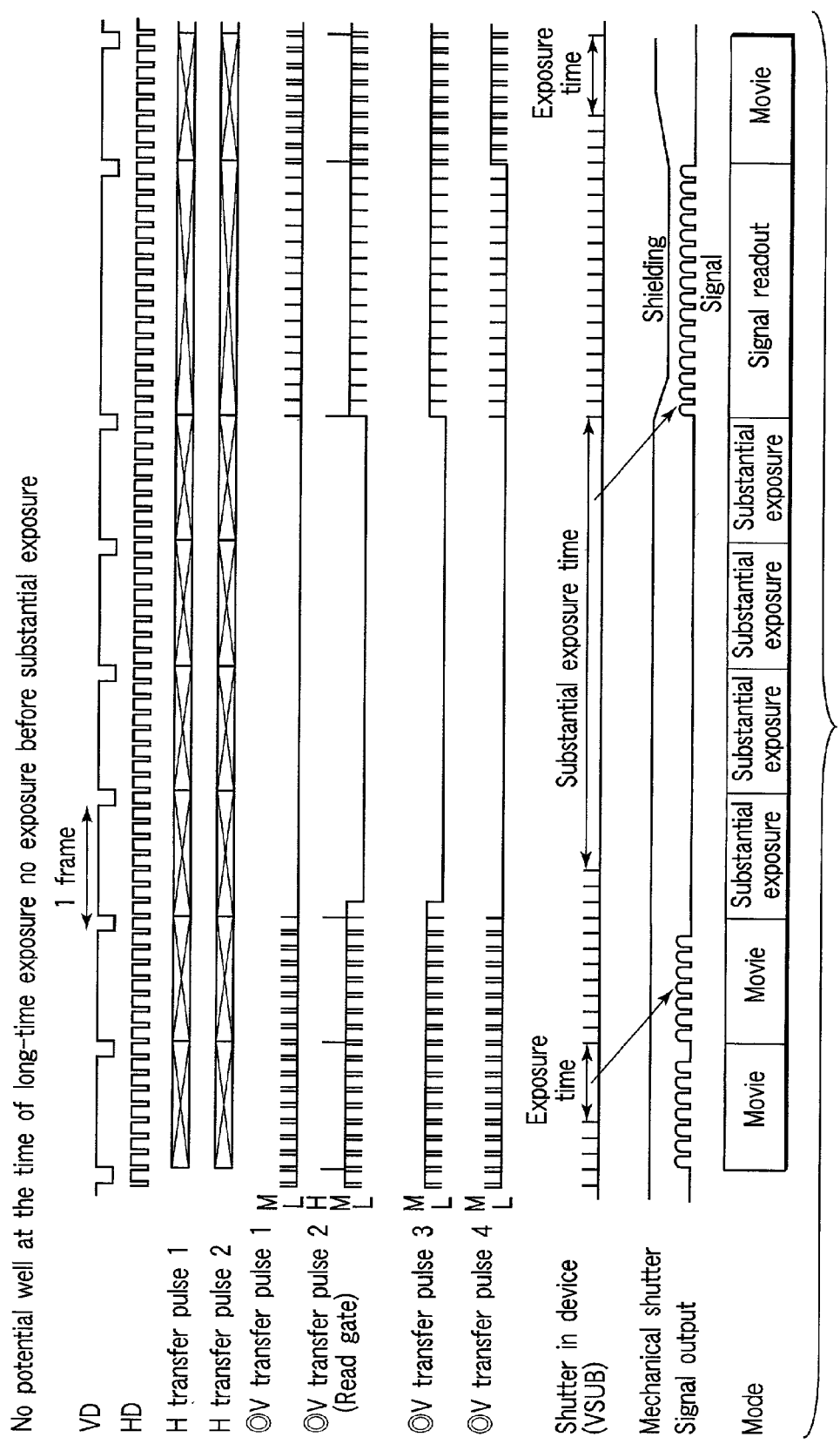
FIG. 14 is a timing chart showing a fifth example of imaging sequence at long-time exposure for use in this embodiment.

When electrons which are the dark charges are left in the vertical transfer electrode when the low voltage L is set up at all the vertical transfer electrodes V1, V2, V3, and V4, there is a danger that they flow from the VCCD into the PD. Thus, preferably, excessive charges existing on the vertical charge transfer line are expelled by executing the vertical transfer at least in a first frame period under the substantial exposure mode and after that, the low voltage L is set up at the vertical transfer electrodes V1, V2, V3, and V4. Further, by executing the vertical transfer of one frame for expelling the unnecessary electric charges more rapidly than ordinarily as shown in FIG. 13, the time in which V2 is set to the voltage M in the substantial exposure period can be shortened.

Further, it is permissible to inhibit all exposures one frame before this substantial exposure mode is activated, discharge all electric charges by the VSUB pulse and then set the vertical transfer electrodes V1, V2, V3, and V4 at the low voltage L. As a result, no excessive electric charge is sent from the PD to the VCCD before the substantial exposure is started, thereby making it possible to reduce the total amount of electric charges existing on the VCCD. Thus, the inflow of electric charges from the VCCD into the PD can be reduced when the vertical transfer electrodes V1, V2, V3, and V4 are set up to the low voltage L.

Figure 15:
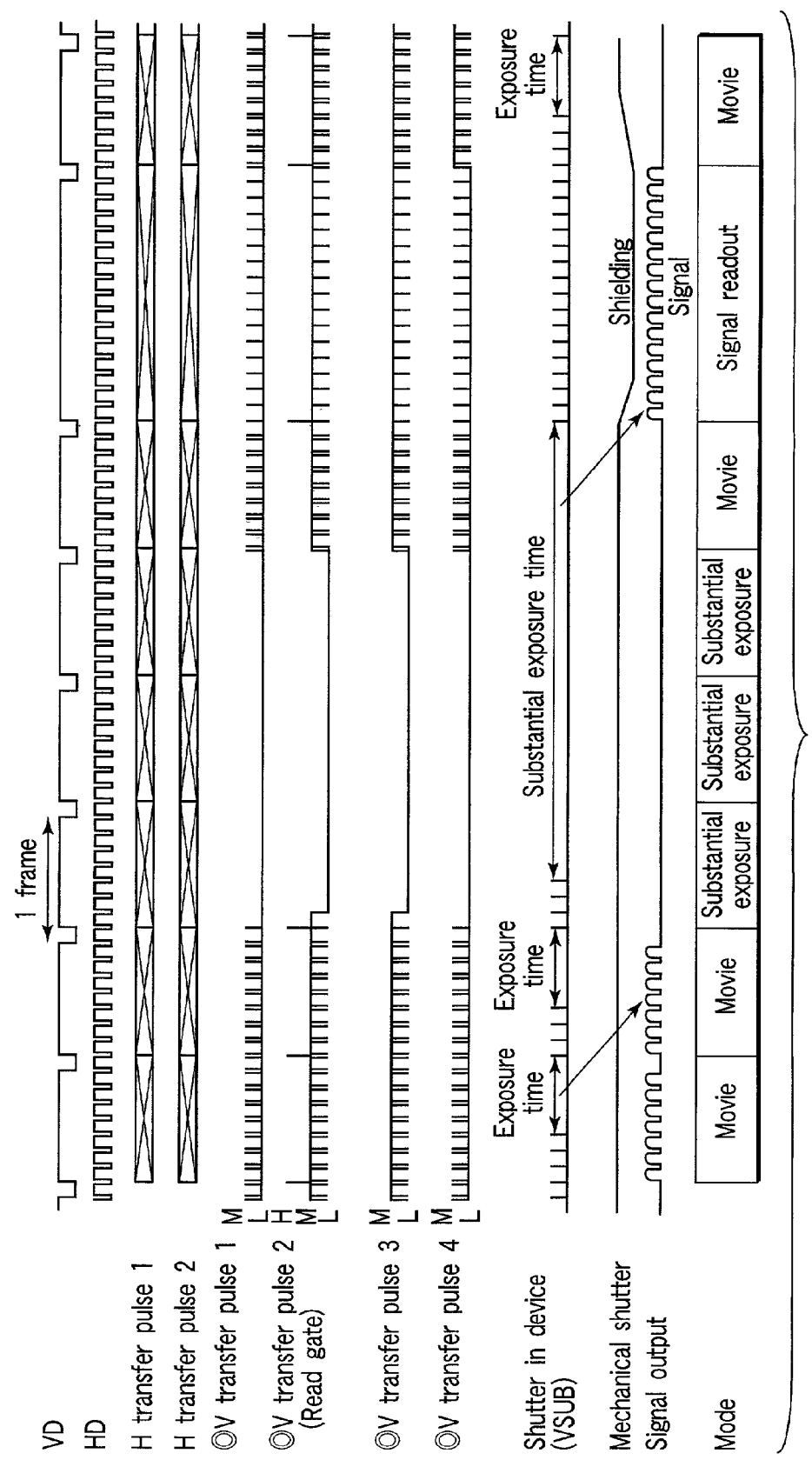
FIG. 15 is a timing chart showing a sixth example of imaging sequence at long-time exposure for use in this embodiment.
Figure 16:
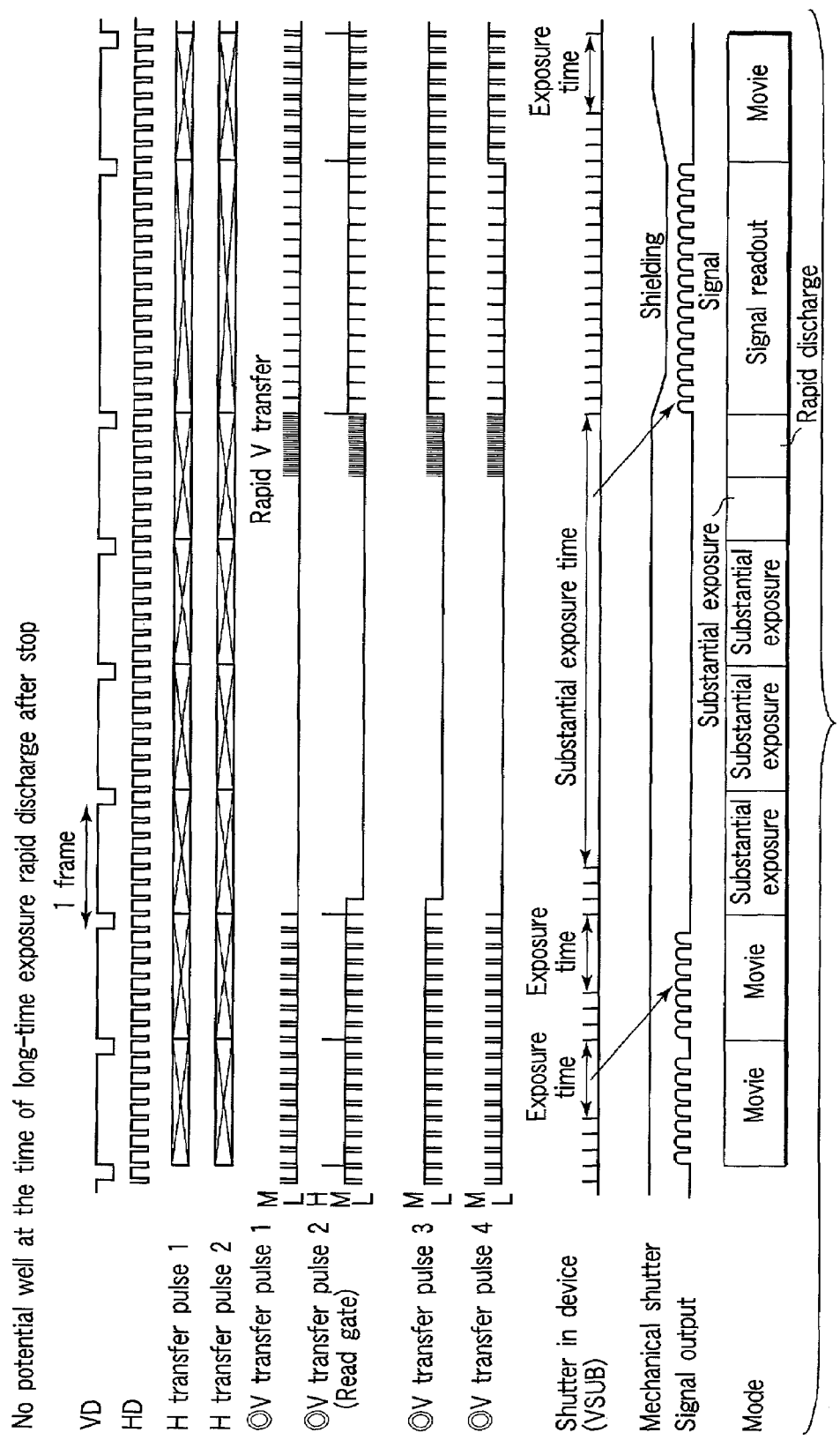
FIG. 16 is a timing chart showing a seventh example of imaging sequence at long-time exposure for use in this embodiment.

FIG. 15 shows an example in which the signal charges are transferred from the PD to the VCCD after the dark charges generated in the VCCD during the vertical transfer driving stop period are discharged. That is, if the driving of the VCCD remains stopped during a long-time exposure period, the dark charges are accumulated in the VCCD. Thus, preferably, the vertical transfer is executed to discharge the dark charges on the VCCD at least in one frame period just before the substantial exposure is terminated. Further, time in which the V2 is set to the voltage M in the substantial exposure period can be reduced by executing the vertical transfer of one frame more rapidly than ordinarily as shown in FIG. 16 in order to discharge electric charges.

Meanwhile, the present invention is not restricted to the above-described embodiments however may be modified in various ways within a scope not departing from the gist of the invention. For example, although according to the embodiment, an example of the four-phase driving system in the VCCD has been described, the present invention may be applied to the two-phase or more driving system as well as the four-phase driving system, because the voltage to be applied to at least the vertical transfer electrode which serves for the read gate also needs to be maintained at the low voltage when the vertical transfer is stopped.

Further, the above embodiments mention a case where the VCCD driving system in which the signal charges of one line are transferred vertically in each horizontal blanking period while accumulating and holding the signal charges in the vertical electrodes V3, V4 and the VCCD driving system in which the vertical transfer is stopped while applying the low voltage L to all the vertical electrodes V1, V2, V3, and V4 are employed separately. However, these driving systems may be combined appropriately in the same imaging apparatus or the same imaging sequence. The VCCD driving system described in this embodiment may be achieved only by control of a driving circuit IC used as the CCD driver 106.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   a lens;
   a photoelectric conversion device to generate and accumulate electric charges corresponding to a light amount of an object inputted through said lens, said photoelectric conversion device having photoelectric conversion elements which are arranged two-dimensionally;
   a vertical charge transfer line which vertically transfers the electric charges generated in said photoelectric conversion device;
   a read gate which transfers the electric charges accumulated in said photoelectric conversion device to said vertical charge transfer line;
   a read gate electrode to control said read gate;
   a vertical transfer electrode, constructed as an m-phase group (m is an integer of 2 or more), to cause said vertical charge transfer line to transfer said electric charges therein;
   a horizontal charge transfer line which horizontally transfers said electric charges transferred through said vertical charge transfer line;
   horizontal transfer electrodes to cause said horizontal charge transfer line to transfer said electric charges therein; and
   a driving circuit which applies a driving pulse to said vertical transfer electrodes and said horizontal transfer electrode, wherein
   said read gate is connected to a predetermined vertical transfer electrode among said m-phase vertical transfer electrodes and a voltage applied to said predetermined vertical transfer electrode, connected to said read gate, is set to be a low voltage while said electric charges are accumulated in said photoelectric conversion device so as not to form a potential well at least under said predetermined vertical transfer electrode connected to said read gate.

2. The imaging apparatus according to claim 1, wherein the voltage applied to all said m-phase vertical transfer electrodes is set to be a low voltage so as not to form a potential well under all said m-phase vertical transfer electrodes while said electric charges are accumulated in said photoelectric conversion device.

3. The imaging apparatus according to claim 2, wherein the vertical transfer of at least one frame is started with said driving circuit just before the electric charges are accumulated in said photoelectric conversion device, and the voltage applied to all said m-phase vertical transfer electrodes is set to be a low voltage after the vertical transfer is completed.

4. The imaging apparatus according to claim 3, wherein the vertical transfer of one frame or more is executed more rapidly than ordinary vertical transfer.

5. The imaging apparatus according to claim 2, further comprising an electronic shutter which resets the electric charges on said photoelectric conversion device, wherein
   exposure is inhibited at least in one frame period just before the voltage applied to all said m-phase vertical transfer electrodes is set to be a low voltage and
   accumulation of said electric charges to said photoelectric conversion device is started after the electric charges in said photoelectric conversion device are reset with said electronic shutter.

6. The imaging apparatus according to claim 2, wherein the vertical transfer of at least one frame is executed with said driving circuit before said electric charges accumulated in said photoelectric conversion device are transferred to said vertical charge transfer line through said read gate to discharge electric charges in said vertical charge transfer line and then, said electric charges are transferred from said photoelectric conversion device to said vertical charge transfer line.

7. The imaging apparatus according to claim 6, wherein the vertical transfer of at least one frame or more is executed more rapidly than ordinary vertical transfer.

* * * * *